Oct. 14, 1941.   J. H. BLANKENBUEHLER ET AL   2,259,288
DYNAMOELECTRIC MACHINE
Filed June 23, 1939
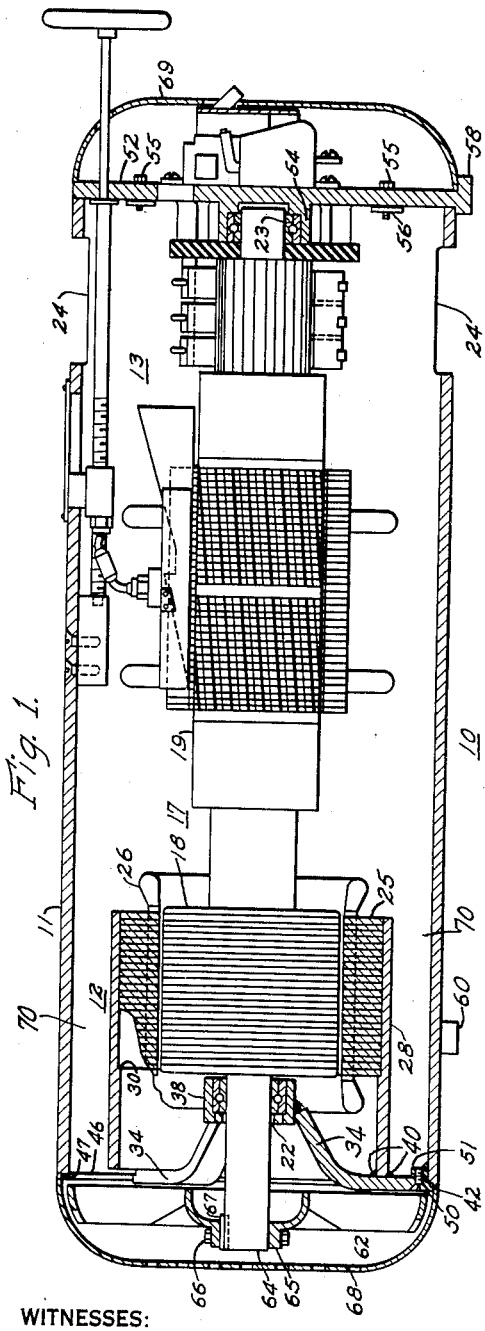
WITNESSES:
Leon M. Garman
F. V. Giolma
INVENTORS
John H. Blankenbuehler
and Theodore C. Fockler.
BY
G. W. Crawford
ATTORNEY Patented Oct. 14, 1941

2,259,288

UNITED STATES PATENT OFFICE 2,259,288

DYNAMOELECTRIC MACHINE

John H. Blankenbuehler, Edgewood, and Theodore C. Fockler, Wilkinsburg, Pa., assignors to Westinghouse Electric & Manufacturing Company, East Pittsburgh, Pa., a corporation of Pennsylvania Application June 23, 1939, Serial No. 280,689

3 Claims. (Cl. 171—123)

Our invention relates, generally to dynamoelectric machines, and it has reference, in particular, to a frame construction for dynamoelectric machines.

The object of our invention, generally stated, is to provide a frame for a dynamo-electric machine which is of simple construction, and which may be inexpensively manufactured.

More specifically, it is an object of our invention to provide a motor-generator set having a common frame member with a generator positioned therein at one end and a motor supported therein in spaced relation thereto at the other end.

Another object of our invention is to provide a simplified construction for a motor-generator set by utilizing a common pipe frame having a generator field structure positioned therein at one end, and an auxiliary motor frame removably supported therein at the other end.

A further object of our invention is to provide in a simple and effective manner for removably supporting a motor stator assembly within a frame member by a bearing support member for also supporting the motor stator structure.

Another important object of our invention is to provide for mounting the motor element of a motor-generator set within a common frame member in spaced relation thereto so as to provide a substantially unrestricted air passage thereabout for efficiently effecting ventilation of the motor-generator set.

Other objects will, in part, be obvious, and will, in part, appear hereinafter.

In practicing our invention, a dynamo-electric machine such, for example, as a motor-generator set may be provided with a common, elongated frame member formed of pipe, or the like, having a generator field structure positioned therein adjacent one end, a motor unit structure or assembly positioned therein adjacent the other end comprising, a motor stator positioned in an auxiliary frame, which is detachably supported in spaced relation to the common frame by means of a bearing support integral with the auxiliary frame, and a rotor member rotatably positioned therein in association with the generator and motor structures.

For a more complete understanding of the nature and scope of our invention, reference may be had to the following detailed description, and to the accompanying drawing, in which:

Figure 1 is a longitudinal section view of a motor-generator set embodying our invention, and Fig. 2 is an end view of the auxiliary frame and bearing support members of the motor unit.

In Figure 1, the reference numeral 10 denotes, generally, a motor-generator set comprising, for example, an elongated, common, tubular frame member 11, which may be formed from a suitable length of pipe or the like and which is of substantially uniform cross-section having a motor unit structure or stator assembly 12 positioned therein adjacent one end, and a generator field structure 13 positioned therein adjacent the other end. A common rotor member 17 for the motor-generator set, comprising a motor rotor 18 and a generator armature 19, is rotatably supported in the common frame member 11 by means of suitable bearings 22 and 23, in a manner which will hereinafter be explained in detail. Suitable openings 24 may be provided around the frame member 11 at the generator end for gaining access to the generator brushes, and effecting ventilation of the motor and generator structures. The details of the generator structure are set forth in the copending application of John H. Blankenbuehler, Serial No. 280,687, filed June 23, 1939, and in the joint application of John H. Blankenbuehler and William R. Harding, Serial No. 280,688, filed June 23, 1939.

Referring to Figs. 1 and 2 of the drawing, it will be seen that the motor stator assembly may, for example, comprise a motor stator 25 of the usual type, with the associated stator windings 26, and may be removably mounted in the frame 11, being, for example, positioned in an auxiliary motor frame member 28 within the common frame member 11. The auxiliary motor frame member 28 may be cylindrical in shape, and may, for example, comprise a suitable length of pipe or tubing, having an outside diameter somewhat less than the inside diameter of the frame member 11 so as to provide an annular passage therebetween when it is positioned therein. The inside of the auxiliary motor frame member 28 at one end is disposed to provide a relatively tight fit for the stator 25 and a peripheral shoulder 30 is provided for engaging the stator to position it in a predetermined position therein.

Suitable means may be provided to support the bearing 22 and the auxiliary motor frame member 28 in the motor end of the common frame member 11 of the motor-generator set, such as the support members 34. For example, the support members 34 may comprise lengths of metal strap or bar stock, or the like, attached radially to a bearing housing 38, which is adapted to receive the bearing 22, and to one end of the auxiliary frame member 28 in any suitable manner, such as by welding 40, so that the housing 38 is centrally located with respect to the auxiliary frame member, and the support members 34 extend radially therefrom. To properly locate the bearing housing 38 and the auxiliary motor frame member 28 relative to the common frame member 11, the support members 34 may, for example, interfit with the end of the frame 11, being machined at the outer ends to provide recessed surfaces 42 on the side adjacent the auxiliary motor frame, and arcuate end surfaces 44, which are respectively disposed to engage a peripheral (recessed end surface) 46 and the adjoining flange portion 47 on the motor end of the frame 11, so as to center the bearing housing 38 and the auxiliary motor frame 28 therein. For example, after the support members 34, the bearing housing 38 and the auxiliary frame 28 have been integrated by welding, the inner surfaces of the bearing housing 38 and the auxiliary frame 28, and the arcuate end surfaces 44 of the support members 34 may be simultaneously machined in a boring mill, a lathe, or the like, so as to insure a predetermined relation between these surfaces, and thus accurately align the parts when they are positioned in the frame member 11. Suitable openings 48 may be provided adjacent the ends of the support members 34 for receiving screws 50 which may be threaded into inwardly projecting lugs 51 about the end of the frame 11 (only one of which is shown) for securing the auxiliary motor frame member 28 to the common frame member 11.

An end member 52 having a centrally disposed bearing housing 54 for receiving the bearing 23 may be secured to the common frame member 11 at the generator end thereof, by means of screws 55 which may, for example, be threaded into inwardly projecting lugs 56 on the frame member 11. The end member 52 is preferably substantially flat on its outer face, so as to facilitate the mounting of the motor and generator control switches thereon, and it is provided with a dependent flanged portion 58 for supporting the generator end of the frame 11. Suitable means may be provided for supporting the motor end of the frame 11, such as the support member 60, which may be secured to the underside of the frame adjacent the motor end, in any suitable manner.

In order to provide for efficiently ventilating the motor-generator set, a blower 62 may be mounted on a shaft extension 64 of the rotor member 17, which projects through the bearing 22 at the motor end of the motor-generator set, and may be secured thereto in any manner well known in the art, such as by being provided with a split hub 65 having screws 66 (only one of which is shown) for obtaining clamping engagement thereof with the shaft extension, and a key 67 to prevent rotation relative thereto. Protective metal end covers 68 and 69 are secured in any suitable manner to the motor and generator ends of the frame member 11, respectively, the cover 68 being perforated so as to provide for the passage of air therethrough for ventilating the motor stator assembly and the generator field structure.

In assembling the motor-generator set, the generator field structure 13 may be secured within the frame member 11 at one end in the usual manner, and the motor unit structure or stator assembly 12 positioned therein at the other end with the ends of the support members 34 interfitting with the end surfaces 46 and 47 of the frame 11, and secured by the screws 50. The bearing 22 may then be positioned in the bearing housing 38 and the rotor member 17 placed in position with the shaft extension 64 projecting through the bearing 22. The bearing 23 is then positioned in the bearing housing 54 of the end member 52 and the end member secured to the frame 11 by the screws 55. The blower 62 may then be clamped on the shaft extension 64 and the end covers 68 and 69 secured to their respective ends of the frame 11.

By mounting the auxiliary motor frame 28 in the common frame member 11 in spaced relation thereto, and securing the blower 62 to the shaft extension of the rotor member 17 at the motor end thereof, as described, it will be apparent that more efficient ventilation of the motor-generator set may be secured than in the constructions of the prior art. The blower 62 being easily accessible for removal at the motor end of the common frame member 11 may be of as large a diameter as the frame 11 will permit, since it does not have to be passed through the motor or generator structures in removing either it alone, or the rotor member 17.

As the motor unit 12 is positioned in spaced relation to the common frame member 11, a divided flow of air may be obtained through the latter, a portion of the air being forced by the blower 62 through the motor unit 12 to cool the stator windings thereof, and a portion passing through the peripheral passage 70 about the motor unit to impinge directly on the generator field structure 13, instead of having to first pass over the heated motor windings. Thus the ventilation of the motor and generator structures may be properly proportioned so that the generator is not supplied with a large volume of air heated from passing over the motor windings.

Accurate alignment of the stator of the motor unit 12 with the bearing 22, and of each of them with the common frame member 11, is more readily obtainable by using a frame construction such as disclosed in our invention, since the several surfaces of the auxiliary frame, the support arms and the bearing housing may be simultaneously machined. The frame structure is greatly simplified by utilizing the support arms of the bearing 22 for positioning the auxiliary motor frame 28 within the common frame member 11, and by using the tubular common frame construction disclosed, the necessity for expensive cast motor-generator frame constructions is obviated.

By providing for mounting the motor stator and winding in a unit or assembly in the manner hereinbefore described, it will be apparent that an improved motor construction is thereby provided, and that servicing of the motor-generator is greatly facilitated, since the rotor member 17 may be removed for inspection merely by unscrewing the screws 50 and lifting out the auxiliary frame and rotor. The motor unit or stator assembly 12 may also be readily removed as a unit and the windings 26 inspected without requiring the stator 25 to be pressed out of the auxiliary frame. The blower 62 is merely removed, the screws 50 removed, and the motor unit then lifted out of the common frame 11. The frame construction provided by our invention greatly facilitates the manufacture of motor-generator sets requiring motors having a number of different voltage ratings since the common frame member and the generator field structure may be standardized, and motor units of a number of sizes may be made interchangeable therewith. In order to provide a motor-generator set for the desired motor voltage, the correct motor unit may be readily positioned in the common frame member without requiring any pressing operations to remove the windings and stator punchings from a press fit within the auxiliary frame, as would be the case in the usual construction where the stator windings and punchings are positioned in a motor-generator frame by being pressed therein. Thus it is not necessary for the manufacturer or distributor to stock such a complete line of motor-generator sets, since the motor units may be interchanged and the correct combination readily provided with a minimum of labor and expense.

Since certain changes may be made in the above description, and different embodiments of the invention may be made without departing from the spirit thereof, it is intended that everything contained in the above description or shown in the accompanying drawing, shall be considered as illustrative and not in a limiting sense.

We claim as our invention:

1. The combination in a motor generator unit having a common elongated frame with a generator field structure positioned therein adjacent one end, a rotor comprising a motor rotor and a generator armature structure, and an end member at the generator end of the common frame having a bearing for supporting the generator end of the rotor, of a motor frame, a motor stator positioned within the motor frame, a bearing support for the motor end of the rotor, and a plurality of spaced radial support members secured to the motor frame and bearing support to maintain them in fixed relation and extending beyond the motor frame to engage the common frame and position the motor frame within and in spaced relation to the common frame.

2. In a motor generator set the combination with a unit tubular frame having a generator field structure positioned therein adjacent one end, a rotor unit comprising a motor rotor and a generator armature, and a bearing support for the generator end of the rotor unit of a tubular motor frame positioned within and in spaced relation to the unit tubular frame, a motor stator positioned within the motor frame, and a bearing support for the motor end of the rotor unit including a plurality of spaced radial arms integral with the motor frame extending beyond the motor frame and detachably secured to the unit frame to support the motor frame and the bearing support therein.

3. A frame for a dynamo-electric machine comprising, an outer frame, a tubular motor frame having an end cover, a laminated stator core with associated windings positioned within the said motor frame, and a bearing housing integrated with the motor frame by spaced apart support members positioned within the end cover and secured to the motor frame and housing by welding, said support members extending beyond the motor frame and detachably secured to the said outer frame to detachably position the motor frame within the outer frame and in spaced relation thereto at one end thereof.

JOHN H. BLANKENBUEHLER.
THEODORE C. FOCKLER.